(12) United States Patent
Komäromi et al.

(10) Patent No.: US 11,570,215 B2
(45) Date of Patent: Jan. 31, 2023

(54) TECHNIQUE FOR ENABLING SIGNALING MESSAGE CORRELATION

(71) Applicant: Telefonaktiebolaget LM Ericsson (publ), Stockholm (SE)

(72) Inventors: Kornél Komäromi, Boldva (HU); Zoltán Elzer, Budapest (HU); Benedek Kovacs, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 89 days.

(21) Appl. No.: 16/964,398

(22) PCT Filed: Jan. 25, 2018

(86) PCT No.: PCT/EP2018/051806
§ 371 (c)(1),
(2) Date: Jul. 23, 2020

(87) PCT Pub. No.: WO2019/145033
PCT Pub. Date: Aug. 1, 2019

(65) Prior Publication Data
US 2021/0051183 A1 Feb. 18, 2021

(51) Int. Cl.
*H04L 65/1016* (2022.01)
*H04L 65/1069* (2022.01)
(Continued)

(52) U.S. Cl.
CPC ...... *H04L 65/1016* (2013.01); *H04L 65/1069* (2013.01); *H04L 65/1073* (2013.01); *H04L 65/1104* (2022.05); *H04W 60/00* (2013.01)

(58) Field of Classification Search
CPC ............ H04L 65/1006; H04L 65/1016; H04L 65/1036; H04L 65/104; H04L 65/1069;
(Continued)

(56) References Cited

U.S. PATENT DOCUMENTS 8,494,522 B2 * 7/2013 Chen ..................... H04W 60/00
455/432.1
8,848,604 B2 9/2014 Gyan
(Continued)

FOREIGN PATENT DOCUMENTS

EP 2725841 A1 4/2014
WO 2009/071120 A1 6/2009
(Continued)

OTHER PUBLICATIONS

International Search Report and Written Opinion of the International Searching Authority dated Sep. 27, 2018 issued in PCT Application No. PCT/EP2018/051806, consisting of 11 pages.
(Continued)

*Primary Examiner* — Khaled M Kassim
*Assistant Examiner* — Kai Chang
(74) *Attorney, Agent, or Firm* — Christopher & Weisberg, P.A.

(57) ABSTRACT

A technique for enabling signaling message correlation in a telecommunication network is disclosed. A method implementation of the technique is performed by a network node in the telecommunication network and includes receiving a first signaling message as part of a signaling procedure among a plurality of network nodes in the telecommunication network, the first signaling message being transmitted using a first signaling protocol and including a correlation identifier being propagated along a message flow of the signaling procedure, and triggering transmitting a second signaling message as part of the signaling procedure using a second signaling protocol different from the first signaling protocol, wherein the correlation identifier of the first signaling message is incorporated into the second signaling message for further propagation.

9 Claims, 11 Drawing Sheets

(51) Int. Cl.
*H04L 65/1073* (2022.01)
*H04W 60/00* (2009.01)
*H04L 65/1104* (2022.01)

(58) Field of Classification Search
CPC ... H04L 65/1073; H04L 67/146; H04L 69/18; H04M 7/0093; H04W 60/00
See application file for complete search history.

(56) References Cited

U.S. PATENT DOCUMENTS

| | | | | |
|---|---|---|---|---|
| 10,530,903 | B2* | 1/2020 | Ahn | H04L 43/04 |
| 11,190,541 | B2* | 11/2021 | Nakajima | H04L 63/1458 |
| 2011/0044446 | A1* | 2/2011 | Connelly | H04M 7/0069 |
| | | | | 379/220.01 |
| 2013/0128873 | A1* | 5/2013 | Eipe | H04W 76/10 |
| | | | | 370/338 |
| 2014/0003333 | A1* | 1/2014 | Ivershen | H04W 24/08 |
| | | | | 370/328 |
| 2016/0295398 | A1* | 10/2016 | Ketheesan | H04W 4/12 |
| 2017/0013028 | A1* | 1/2017 | Yang | H04N 21/8586 |
| 2018/0041934 | A1* | 2/2018 | Agarwal | H04W 76/27 |
| 2019/0109628 | A1* | 4/2019 | Murakami | H04L 1/0618 |
| 2019/0274177 | A1* | 9/2019 | Kuge | H04W 48/12 |

FOREIGN PATENT DOCUMENTS

| | | |
|---|---|---|
| WO | 2011/047716 A1 | 4/2011 |
| WO | 2016/075637 A1 | 5/2016 |

OTHER PUBLICATIONS

Internet Engineering Task Force (IETF) Request for Comments: 7329 Category: Informational ISSN: 2070-1721-H. Kaplan Oracle Aug. 2014, consisting of 17 pages.

Multi-Protocol Correlation: Data Record Analyses and Correlator Design by Ole-Martin Rodal & Erdem O zkan; University of Agder Faculty of Engineering and Science Department of ICT, May 25, 2011, consisting of 99 pages.

* cited by examiner

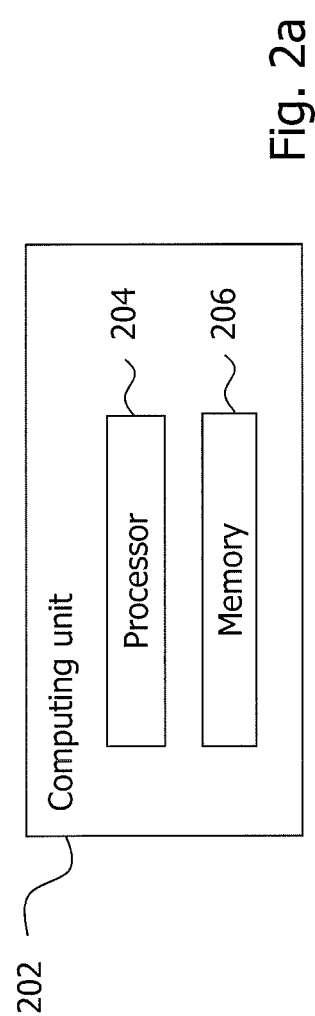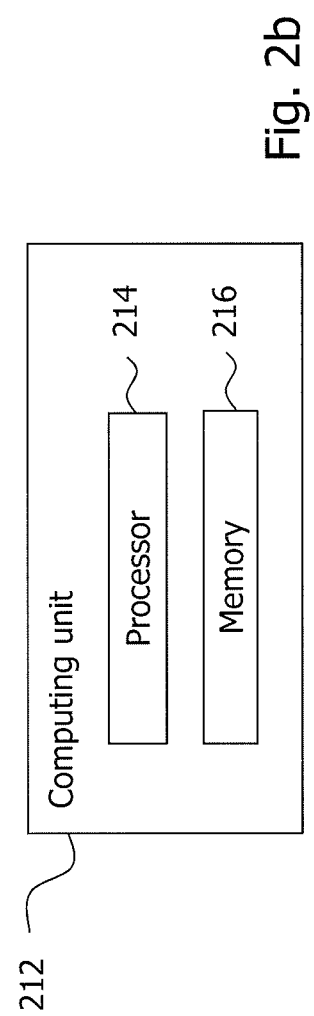

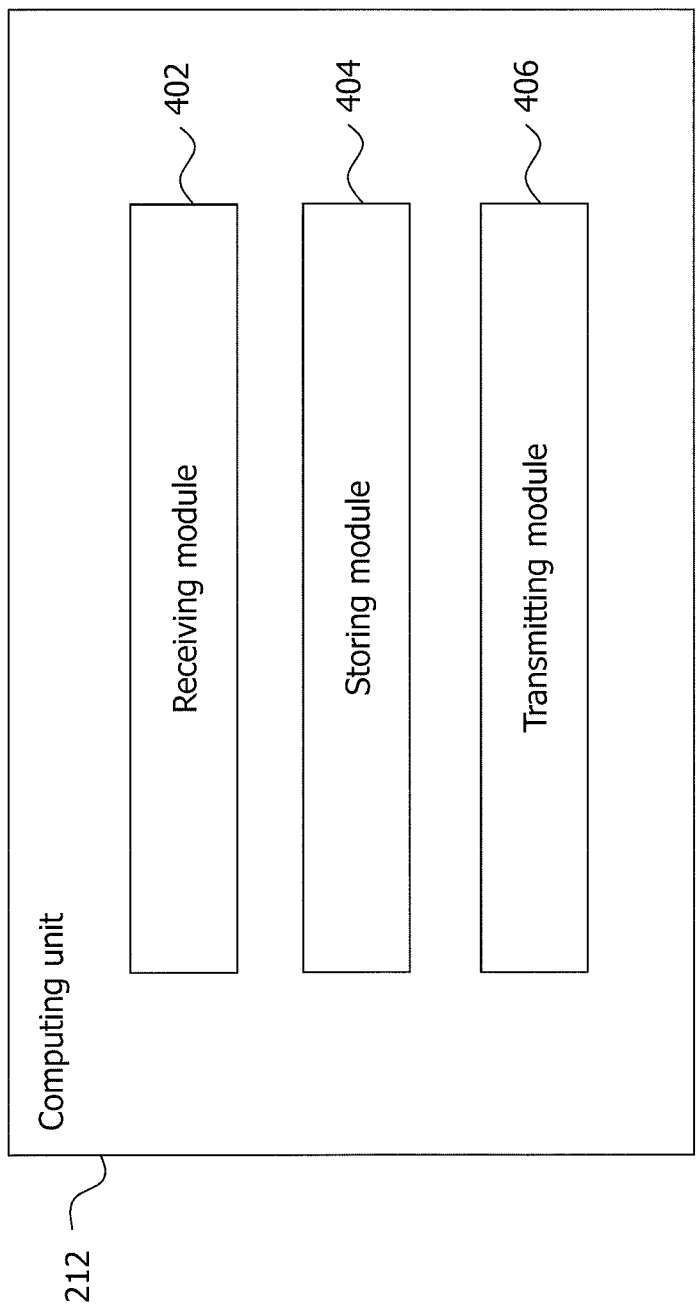

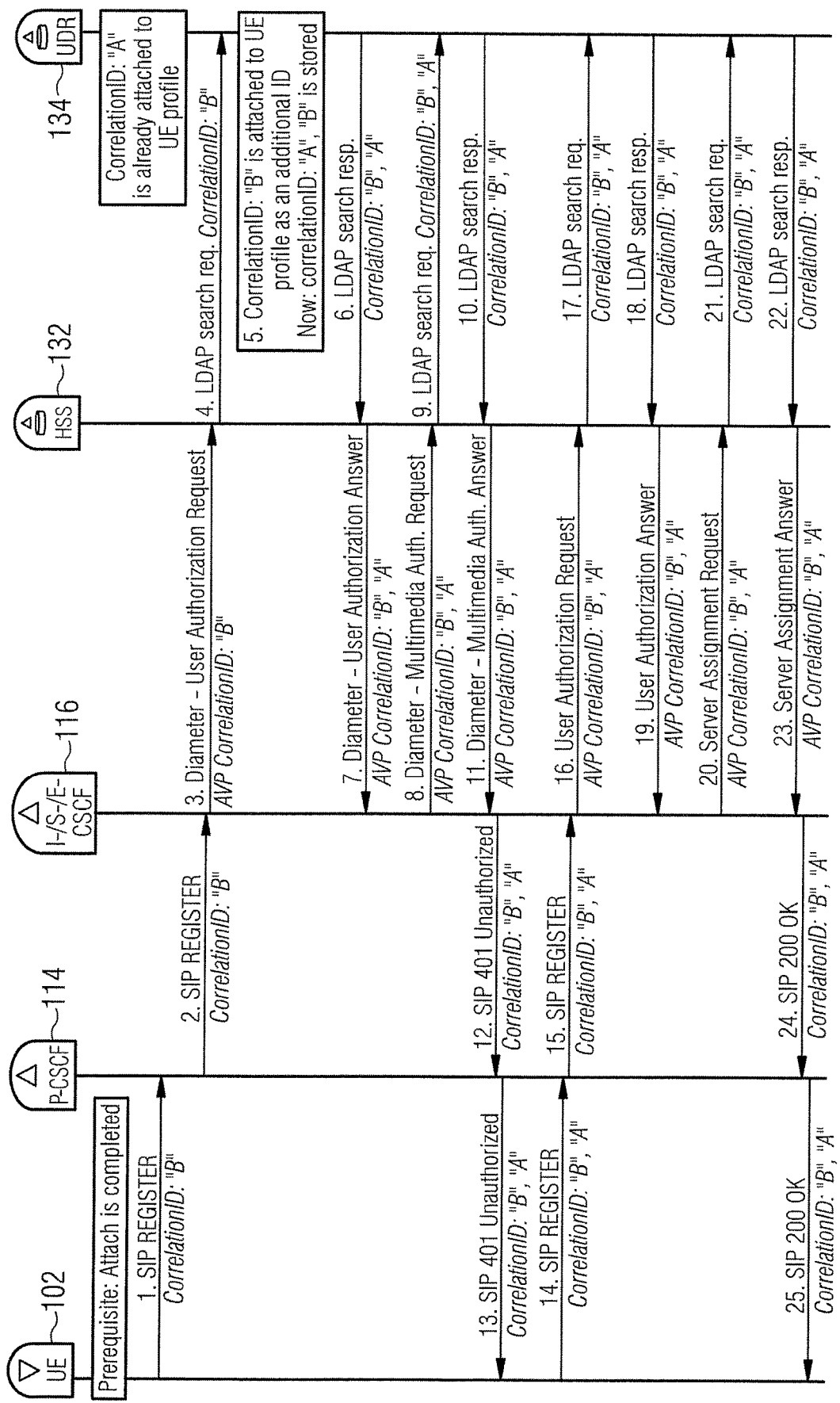

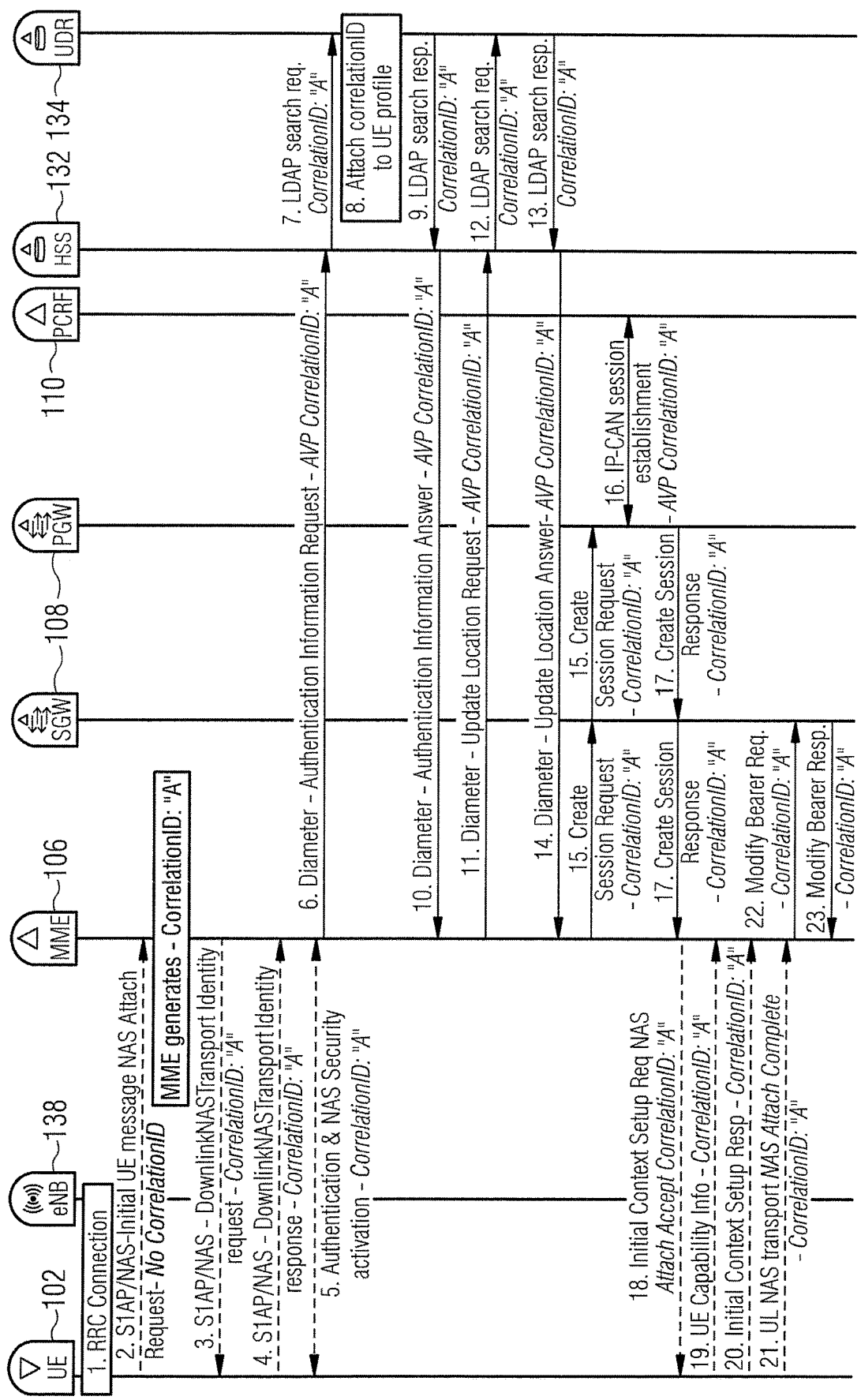

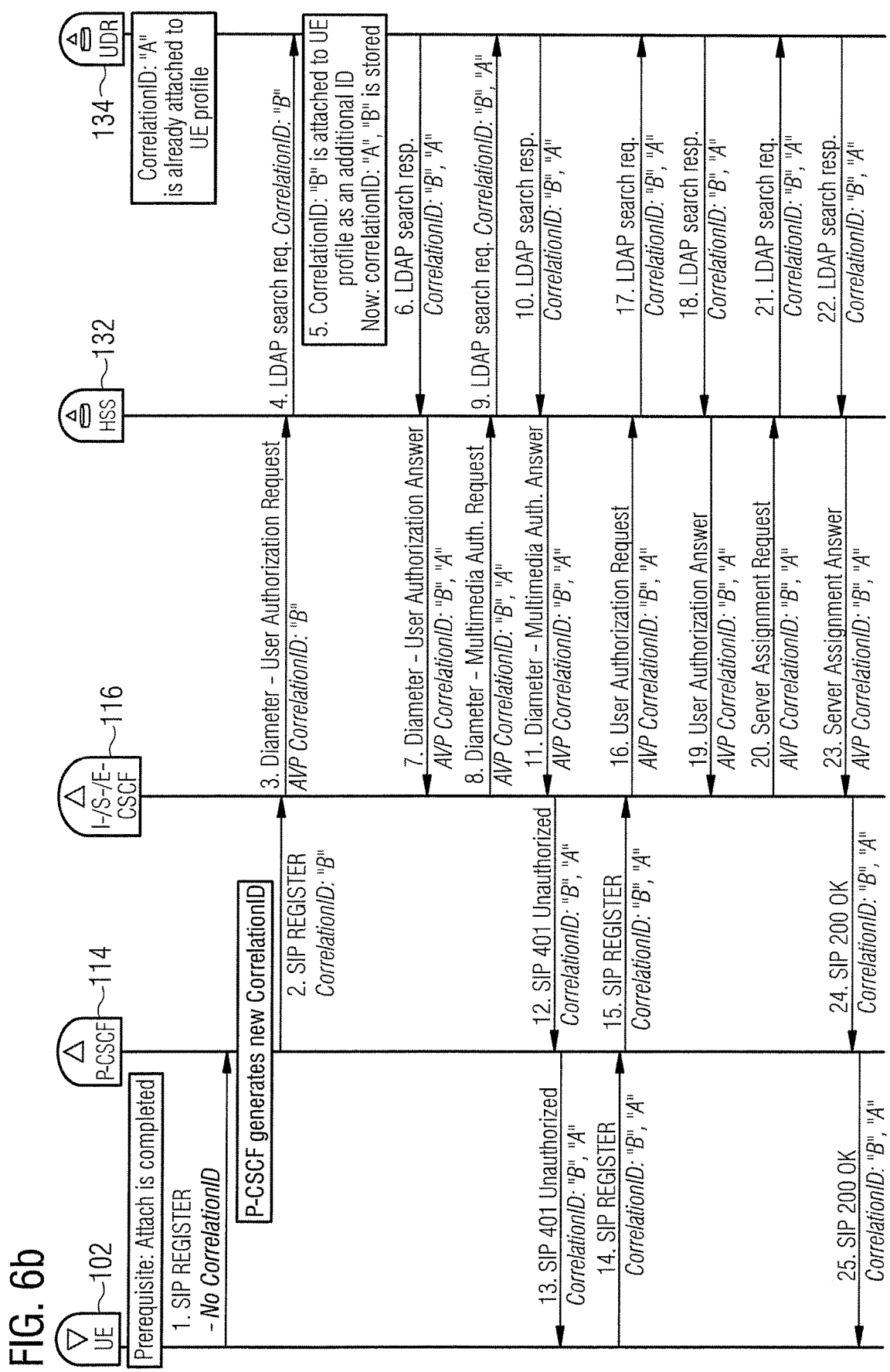

TECHNIQUE FOR ENABLING SIGNALING MESSAGE CORRELATION

CROSS-REFERENCE TO RELATED APPLICATIONS

This application is a Submission Under 35 U.S.C. § 371 for U.S. National Stage Patent Application of International Application Number: PCT/EP2018/051806, filed Jan. 25, 2018 entitled "TECHNIQUE FOR ENABLING SIGNALING MESSAGE CORRELATION," the entirety of which is incorporated herein by reference.

TECHNICAL FIELD

The present disclosure generally relates to telecommunication networks. In particular, a technique for enabling signaling message correlation in a telecommunication network is presented. The technique may be embodied in methods, computer programs, apparatuses and systems.

BACKGROUND

In the field of telecommunication, techniques for the correlation of signaling messages are employed for various purposes, including troubleshooting network-related problems, collecting data for further usage in analytics systems, or the like. Correlation of the messages is typically carried out using information that is part of the message chunks forwarded in end-to-end communications, such as metadata describing information used in a signaling flow, for example.

Existing correlation techniques generally operate on given protocol structures of different communication protocols employed in end-to-end communications in a telecommunication network and usually require additional computation performed in external functions. In Voice over Long Term Evolution (VoLTE) networks, for example, correlation of traffic on subscriber basis or on session basis between different protocols can be carried out using external entities, such as probes and monitoring or analytic applications, wherein correlation is then performed based on the packets captured by the probes, for example.

The use of different protocols which, in turn, use different data or data structures for describing the information carried in the signaling flow makes the identification and correlation of data sometimes difficult. In particular, correlating an end-to-end flow of signaling messages may be difficult when it comes to putting together the different information included in the different messages and performing correlation may also be resource consuming because the diverse data needs to be processed accordingly. Sometimes, correlation of signaling data may even be impossible due to unmatchable signaling identifiers or due to a one-to-many correlation setup.

A protocol-based solution for supporting correlation of signaling messages has been developed for the Session Initiation Protocol (SIP), as specified in IETF RFC 7329. However, this solution is restricted to the SIP protocol only and cannot solve the above problems in all cases of end-to-end communication carried out in a telecommunication network.

SUMMARY

Accordingly, there is a need for a correlation technique that avoids one or more of the problems discussed above, or other problems.

According to a first aspect, a method for enabling signaling message correlation in a telecommunication network is provided. The method is performed by a network node in the telecommunication network and comprises receiving a first signaling message as part of a signaling procedure among a plurality of network nodes in the telecommunication network, the first signaling message being transmitted using a first signaling protocol and including a correlation identifier being propagated along a message flow of the signaling procedure, and triggering transmitting a second signaling message as part of the signaling procedure using a second signaling protocol different from the first signaling protocol, wherein the correlation identifier of the first signaling message is incorporated into the second signaling message for further propagation.

The correlation identifier may be a (e.g., globally) unique identifier that is propagated along the message flow of the signaling procedure in order to enable correlating the signaling messages of the message flow based on the correlation identifier. During propagation in the message flow, the correlation identifier may remain unchanged so that the correlation identifier may be used as linking information that enables identifying that the signaling messages of the message flow belong together, e.g., belong to the same signaling procedure or, more generally, to the same end-to-end communication in the telecommunication network.

The first signaling message received by the network node as part of the signaling procedure may be one among the signaling messages of the message flow and the second signaling message transmitted by the network node may be a subsequent signaling message of the message flow. By incorporating the correlation identifier from the first signaling message into the second signaling message, the correlation identifier may be propagated in the message flow to a next hop in the signaling procedure. The correlation identifier may also be said to be transferred from the first signaling message to the second signaling message. Since the first signaling message may be transmitted using a first signaling protocol and the second signaling message may be transmitted using a second signaling protocol different from the first signaling protocol, the correlation identifier may be propagated across different communication protocols used in the message flow and thereby enable signaling message correlation in the telecommunication network across different protocols.

The network node may be one of the plurality of network nodes of the telecommunication network and may implement a particular network function in the telecommunication network. In particular, the network node may be configured to receive signaling messages from a preceding network node in the message flow and transmit signaling messages to a subsequent network node in the message flow using different communication protocols, while transferring the correlation identifier carried in the signaling messages. Hereinafter, the network node is thus sometimes denoted as "transferring network node". The telecommunication network may be a mobile communication network, such as a 4G or 5G network, for example, but is not limited thereto, and it will be understood that the technique presented herein may be practiced in any other type of telecommunication network as well. As a mere example, in a Long Term Evolution (LTE) network, the network node may correspond to a Mobility Management Entity (MME) which receives signaling messages from an eNodeB using an S1 Application Protocol (S1AP) and which transmits subsequent signaling messages to a Home Subscriber Server (HSS) using a Diameter protocol in an attach procedure of a user equipment.

The signaling procedure may correspond to any flow of signaling messages exchanged between a plurality of network nodes in the telecommunication network, including a user equipment. In one implementation, the signaling procedure may be associated with, or more specifically, be initiated by a user equipment. In this case, the signaling procedure may comprise at least one of an attach procedure of the user equipment to the telecommunication network, and a registration procedure of the user equipment with a subsystem of the telecommunication network, for example. The subsystem of the telecommunication network may be an Internet Protocol (IP) Multimedia Subsystem (IMS), for example. It will be understood that these signaling procedures are merely exemplarily and that the correlation identifier may be passed along any other signaling procedure in the telecommunication network, such as call session procedures, re-registration procedures, de-registration procedures, service request procedures, bearer setup procedures, Packet Data Network (PDN) establishment procedures, or the like. In some of these procedures, the procedure may also be initiated by a particular network node in the telecommunication network, and not necessarily by the user equipment, as mentioned above.

The correlation identifier may be generated by the user equipment for propagation in the signaling procedure, in particular when the signaling procedure is associated with the user equipment, such as in the above-mentioned attach or registration procedures. Alternatively, the correlation identifier may be generated by a particular network node among the plurality of network nodes in the telecommunication network upon receipt of a signaling message without correlation identifier as part of the signaling procedure. In this case, the particular network node may be an edge node of the telecommunication network or a subsystem thereof, e.g., a first node of the telecommunication network or the subsystem which receives a signaling message as part of the signaling procedure (e.g., initiated by the user equipment), wherein the signaling message does not include a correlation identifier. In the Evolved Packet Core (EPC), the edge node may be an MME, and, in case of the IMS, the edge node may be a Proxy Call Session Control Function (P-CSCF), for example. It will be understood that the particular network node may also be given by any other network node in the telecommunication network, in which case correlation can be performed from this particular node on.

The message flow of the signaling procedure along which the correlation identifier is propagated may comprise all signaling messages of the signaling procedure (e.g., in case the user equipment generates the correlation identifier and initiates the signaling procedure) or may comprise a subset of signaling messages of the signaling procedure (e.g., in case the user equipment initiates the signaling procedure and the correlation identifier is generated by an edge node of the telecommunication network). In other words, the correlation identifier may be propagated in all messages of the signaling procedure subsequent to the generation of the correlation identifier. Additionally, the correlation identifier may also be propagated in (optionally all) messages associated with the user equipment subsequent to completion of the signaling procedure, e.g., until the user equipment detaches from the network or de-registers from its subsystem, respectively. Optionally, the correlation identifier may also be terminated and not be forwarded by a network node.

Each signaling protocol used for transmission of the signaling messages in the signaling procedure, e.g., each of the first signaling protocol and the second signaling protocol, may be one of an S1AP protocol, a Non Access Stratum (NAS) protocol, a Diameter protocol, a Lightweight Directory Access Protocol (LDAP), a General Packet Radio Service (GPRS) Tunneling Protocol for Control plane (GTP-C), a GPRS Tunneling Protocol for User plane (GTP-U), an SIP protocol, and a Media Gateway Control Protocol (Megaco, also known as H.248), for example. It will be understood, however, that these protocols are merely exemplarily and particularly apply to the case of the above-mentioned attach and registration procedures.

Depending on the particular signaling procedure, it will be understood that other signaling protocols may be employed, such as a Domain Name Service (DNS) protocol, a Remote Authentication Dial-In User Service (RADIUS) protocol, a Customized Applications for Mobile networks Enhanced Logic (CAMEL) protocol, a Mobile Application Part (MAP) protocol, an XML Configuration Access Protocol (XCAP), a Lightweight Machine-to-Machine (LWM2M) protocol, and a Message Queuing Telemetry Transport (MQTT) protocol, just to name a few.

As explained above, when the correlation identifier of the first signaling message is incorporated into the second signaling message, the correlation identifier may be said to be transferred from the first signaling message to the second signaling message for further propagation. Incorporating the correlation identifier of the first signaling message into the second signaling message may comprise transferring a value of the correlation identifier from a field of the first signaling message into a field of the second signaling message. In one implementation, the correlation identifier may be carried in an extension field of the respective signaling protocol. For example, in case of the SIP protocol as specified in IETF RFC 3261, the correlation identifier may be provided in an extension field of existing SIP headers and, in case of the Diameter protocol as specified in IETF RFC 6733, the correlation identifier may be provided as a new Attribute-Value Pair (AVP) extension. Alternatively, the correlation identifier may also be carried as encoded information within an existing parameter field of the respective signaling protocol. For example, the correlation identifier may be carried as encoded information in an existing P-Charging-Vector header of the SIP protocol.

According to a second aspect, a method for enabling signaling message correlation in a telecommunication network is provided. The method is performed by a network node operating a central data repository of the telecommunication network and comprises receiving a first signaling message as part of a signaling procedure among a plurality of network nodes in the telecommunication network, the first signaling message including a correlation identifier being propagated along a message flow of the signaling procedure, triggering storing the correlation identifier in the central data repository in association with a user equipment associated with the signaling procedure, and triggering transmitting a second signaling message as part of the signaling procedure, wherein one or more correlation identifiers stored in the central data repository in association with the user equipment are incorporated into the second signaling message for further propagation. The one or more correlation identifiers may comprise the correlation identifier of the first signaling message.

The method according to the second aspect defines a method from another network node's perspective which may be complementary to the method performed by the network node according to the first aspect. In particular, the second signaling message transmitted by the network node of the first aspect may correspond to the first signaling message received by the network node of the second aspect. As such, those aspects described with regard to the method of the first aspect which are applicable to the method of the second aspect may be comprised by the method of the second aspect as well, and vice versa. Unnecessary repetitions are thus omitted in the following.

The network node of the second aspect may, for example, correspond to a Unified Data Repository (UDR) and may be configured to store, as part of the signaling procedure of the network node of the first aspect, the correlation identifier propagated during the signaling procedure in the central data repository in association with the user equipment. Hereinafter, the network node of the second aspect is sometimes denoted as "storing network node". As in the method of the first aspect, the second signaling message transmitted by the network node of the second aspect may be a signaling message which is subsequent to the first signaling message in the message flow.

The one or more correlation identifiers stored in the central data repository in association with the user equipment may each result from a different signaling procedure associated with the user equipment carried out in the telecommunication network. In this context, the method of the second aspect may further comprise receiving a third signaling message as part of another (different) signaling procedure among a plurality of network nodes in the telecommunication network, the third signaling message including another (different) correlation identifier being propagated along a message flow of the other signaling procedure, and triggering storing the other correlation identifier in the central data repository in association with the user equipment.

In such a case, i.e., when two or more correlation identifiers are stored in the central data repository in association with the user equipment, wherein each of the two or more correlation identifiers may result from a different signaling procedure, the two or more correlation identifiers may be incorporated into the second signaling message for further propagation. Providing the different correlation identifiers stored in association with the user equipment with the second signaling message for further propagation in the signaling procedure may enable signaling message correlation across different signaling procedures, even when different correlation identifiers are used in each of the procedures.

According to a third aspect, a computer program product is provided. The computer program product comprises program code portions for performing the method of at least one of the first and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a computing unit for executing a network node enabling signaling message correlation in a telecommunication network is provided. The computing unit comprises at least one processor and at least one memory, the at least one memory containing instructions executable by the at least one processor such that the network node is operable to receive a first signaling message as part of a signaling procedure among a plurality of network nodes in the telecommunication network, the first signaling message being transmitted using a first signaling protocol and including a correlation identifier being propagated along a message flow of the signaling procedure, and trigger transmitting a second signaling message as part of the signaling procedure using a second signaling protocol different from the first signaling protocol, wherein the correlation identifier of the first signaling message is incorporated into the second signaling message for further propagation.

According to a fifth aspect, a computing unit for executing a network node enabling signaling message correlation in a telecommunication network is provided, wherein the network node operates a central data repository of the telecommunication network. The computing unit comprises at least one processor and at least one memory, the at least one memory containing instructions executable by the at least one processor such that the network node is operable to receive a first signaling message as part of a signaling procedure among a plurality of network nodes in the telecommunication network, the first signaling message including a correlation identifier being propagated along a message flow of the signaling procedure, trigger storing the correlation identifier in the central data repository in association with a user equipment associated with the signaling procedure, and trigger transmitting a second signaling message as part of the signaling procedure, wherein one or more correlation identifiers stored in the central data repository in association with the user equipment are incorporated into the second signaling message for further propagation.

The computing units according to the fourth aspect and the fifth aspect may be configured to perform any of the corresponding methods and method steps of the first aspect and the second aspect.

According to a sixth aspect, a system for enabling signaling message correlation in a telecommunication network is provided. The system comprises a computing unit for executing a first network node according to the first aspect, and a computing unit for executing a second network node according to the first aspect, wherein the signaling procedure of the first network node is different from the signaling procedure of the second network node. Thus, in the system of the sixth aspect, the signaling procedure in which the first network node is involved and the signaling procedure in which the second network node is involved may each comprise different message flows.

Although the message flows of these procedures may be different, the signaling procedure of the first network node and the signaling procedure of the second network node may be associated with the same network entity, such as the same user equipment. Further, although the message flows of the signaling procedures may be associated with the same network entity, the signaling procedure of the first network node and the signaling procedure of the second network node may be performed in different domains of the telecommunication network. A domain of the telecommunication network may be understood as a subgroup of network nodes among the plurality of network nodes (also called network functions) in the telecommunication network. The subgroup of network nodes may collaboratively serve to provide common functions or services, for example. As a mere example, the EPC may be considered as a domain which represents the core network architecture corresponding to a subgroup of network nodes including an MME, a Serving Gateway (S-GW), a PDN Gateway (PDN-GW) and a Policy and Charging Rules Function (PCRF), for example. Another example domain may be the IMS which may correspond to a subgroup of network nodes including a P-CSCF, an Interrogating CSCF (I-CSCF), a Serving CSCF (S-CSCF), an Emergency CSCF (E-CSCF), an Application Server, an IMS Access Gateway (IMS AGW), a Breakout Gateway Control Function (BGCF), a Media Gateway Control Function (MGCF), a Media Gateway (MGW) and a Transit Gateway (TRGW), for example.

The correlation identifier propagated in the signaling procedure of the first network node may be identical to the correlation identifier propagated in the signaling procedure of the second network node. In this case, signaling message correlation may be performed using the identical correlation identifier across the different signaling procedures and the different domains. In another variant, the correlation identifier propagated in the signaling procedure of the first network node may be different from the correlation identifier propagated in the signaling procedure of the second network node. In this case, signaling message correlation may be performed with the help of a network node according to the second aspect which, as described above, may be capable of providing different correlation identifiers stored in association with the user equipment for further propagation in a signaling procedure. In this way, signaling message correlation may be enabled across different signaling procedures and also different domains, even when different correlation identifiers are used in the signaling procedures. To support such functionality, the system according to the sixth aspect may further comprise a computing unit for executing a third network node according to the second aspect, wherein, as part of the respective signaling procedure, the respective correlation identifier may be stored in the central data repository operated by the third network node in association with the user equipment.

In order to be able to effectively perform signaling message correlation, the system may further comprise a correlation entity which is configured to correlate signaling messages of at least one of the signaling procedure of the first network node and the signaling procedure of the second network node based on the respective correlation identifiers.

BRIEF DESCRIPTION OF THE DRAWINGS

Embodiments of the technique presented herein are described herein below with reference to the accompanying drawings, in which:

FIGS. 2a and 2b illustrate exemplary compositions of computing units configured to execute a transferring network node and a storing network node according to the present disclosure;

FIGS. 4a and 4b illustrate a modular composition of a computing unit configured to execute a storing network node operating a central data repository and a corresponding method embodiment which may be performed by the storing network node;

FIGS. 5a and 5b illustrate signaling diagrams for an exemplary attach procedure and an exemplary IMS registration procedure of a user equipment for the case that the user equipment generates the correlation identifier;

FIGS. 6a and 6b illustrate signaling diagrams for an exemplary attach procedure and an exemplary IMS registration procedure of a user equipment for the case that an edge node generates the correlation identifier.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, while the following embodiments will be described with regard to attach and registration procedures in a VoLTE network, it will be understood that the present disclosure shall not be limited to such procedures and networks and that the technique presented herein may be practiced with other signaling procedures and in other telecommunication networks as well.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
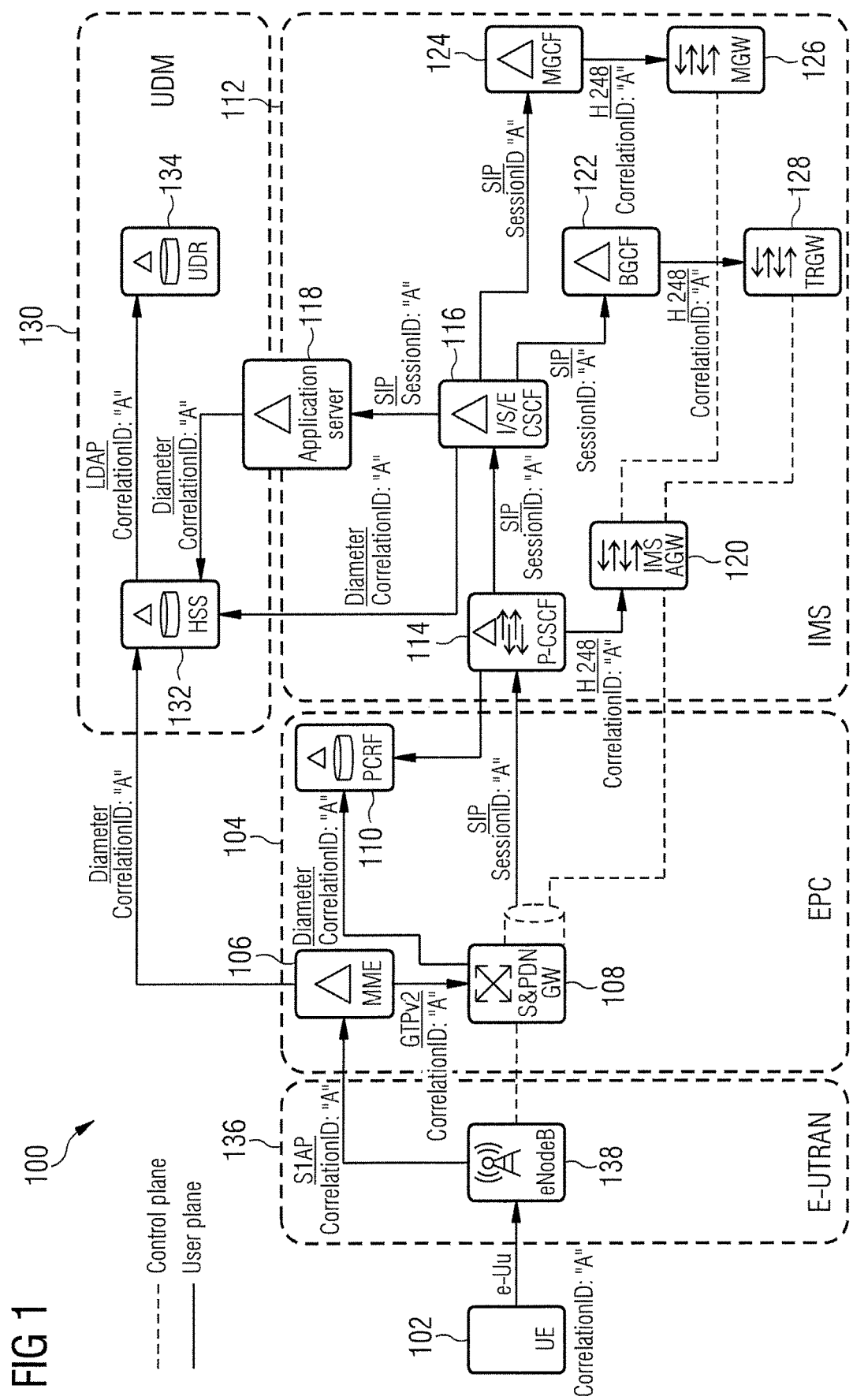
FIG. 1 schematically illustrates an exemplary telecommunication network with a plurality of network nodes in which the techniques of the present disclosure may be practiced.

FIG. 1 schematically illustrates an exemplary telecommunication network 100 which, in the present case, is a mobile communication network that is configured to provide a VoLTE service to a User Equipment (UE) 102. The telecommunication network 100 comprises a plurality of network nodes each of which implements a particular network function in the telecommunication network 100. The plurality of network nodes may conceptually be subdivided in several domains, wherein each domain may be understood as a subgroup of network nodes of the telecommunication network 100 which collaboratively serve to provide common functions or services. As an example, the EPC 104 may be considered as a domain which represents the core network architecture of the telecommunication network 100 and which corresponds to a subgroup of network nodes including an MME 106, an S-GW and PDN-GW 108 (indicated as a single entity in FIG. 1 for ease of illustration) and a PCRF 110. An IMS 112 may be considered as another domain of the telecommunication network 100 which provides the architectural framework for providing IP multimedia services, like voice or video calls, and which corresponds to a subgroup of network nodes including a P-CSCF 114, an I-CSCF, S-CSCF and E-CSCF 116 (again indicated as a single entity in FIG. 1 for ease of illustration), an Application Server 118, an IMS AGW 120, a BGCF 122, an MGCF 124, an MGW 126 and a TRGW 128. Another domain of the telecommunication network 100 may be the User Data Management (UDM) domain 130 which provides identity management and grants user access to different network services. This domain corresponds to a subgroup of network nodes including an HSS 132 as well as a UDR 134. Finally, the Evolved Universal Mobile Telecommunications System (UMTS) Terrestrial Radio Access Network (E-UTRAN) 136 may be considered as another domain which represents the access network with radio interface technology containing one or more eNodeBs 138 to which the UE 102 may connect.

It will be understood that the telecommunication network 100 is merely exemplary and that the technique presented herein may be practiced in any other type of telecommunication network, not only in mobile communication networks, such as 4G or 5G networks. Also, it will be understood that the subdivision into the domains 104, 112, 130 and 136 is merely exemplary and that other groupings of network nodes into domains are generally conceivable.

In FIG. 1, exemplary signaling relationships between the different network nodes are indicated for both the control plane and the user plane. For the control plane, the signaling relationships are labeled by exemplary protocols which indicate which signaling protocols are used for communication between the respective network nodes. Further, for each such signaling relationship, it is indicated that an identical correlation identifier (denoted as "CorrelationID" carrying a value "A" in FIG. 1) which is generated by the UE 102 is propagated along possible control plane message flows in the telecommunication network 100 in order to enable signaling message correlation throughout the telecommunication network 100, even in end-to-end communications across different signaling protocols and different domains. The use of the correlation identifier will be discussed in further detail below.

FIG. 2a illustrates an exemplary composition of a computing unit 202 which is configured to execute a network node that is configured to receive signaling messages from a preceding network node in a message flow and transmits signaling messages to a subsequent network node in the message flow using different signaling protocols, while transferring a correlation identifier carried in the signaling messages for further propagation. Such network node is hereinafter denoted as "transferring network node". In FIG. 1, a transferring network node is the MME 106, for example, which receives signaling messages from the eNodeB 138 using the S1AP protocol, which transmits subsequent signaling messages to the HSS 132 using the Diameter protocol in an attach procedure of the UE 102, and which transfers the correlation identifier "A" from one of these messages to the other. Other examples of transferring network nodes are the S-GW and PDN-GW 108, the P-CSCF 114, the I-/S-/E-CSCF 116, the Application Server 118, the BGCF 122, the MGCF 124, the HSS 132 and the eNodeB 138, as may be gathered from the signaling protocols indicated between the respective network nodes in FIG. 1. The computing unit 202 comprises at least one processor 204 and at least one memory 206, wherein the at least one memory 206 contains instructions executable by the at least one processor 204 such that the computing unit 202 is operable to carry out the method steps described herein with reference to a transferring network node.

FIG. 2b illustrates an exemplary composition of a computing unit 212 which is configured to execute a network node which operates a central data repository of the telecommunication network 100. Such network node is hereinafter denoted as "storing network node". In FIG. 1, a storing network node may correspond to the UDR 134 which stores the correlation identifier "A" in association with a user profile of the UE 102. The computing unit 212 comprises at least one processor 214 and at least one memory 216, wherein the at least one memory 216 contains instructions executable by the at least one processor 214 such that the computing unit 212 is operable to carry out the method steps described herein with reference to a storing network node.

It will be understood that the computing units 202 and 212 may be physical computing units as well as virtualized computing units, such as virtual machines, for example. It will further be appreciated that the computing units may not necessarily be implemented as standalone computing units, but may be implemented as components—realized in software and/or hardware—residing on multiple distributed computing units as well.

Figure 3A:
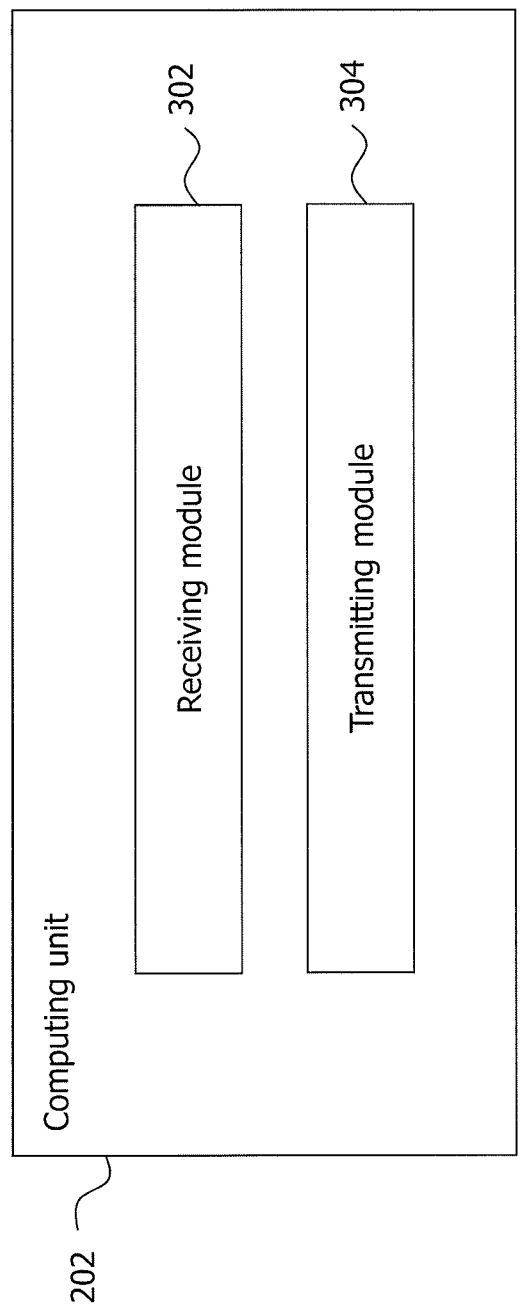
FIGS. 3a and 3b illustrate a modular composition of a computing unit configured to execute a transferring network node according to the present disclosure and a corresponding method embodiment which may be performed by the transferring network node.
Figure 3B:
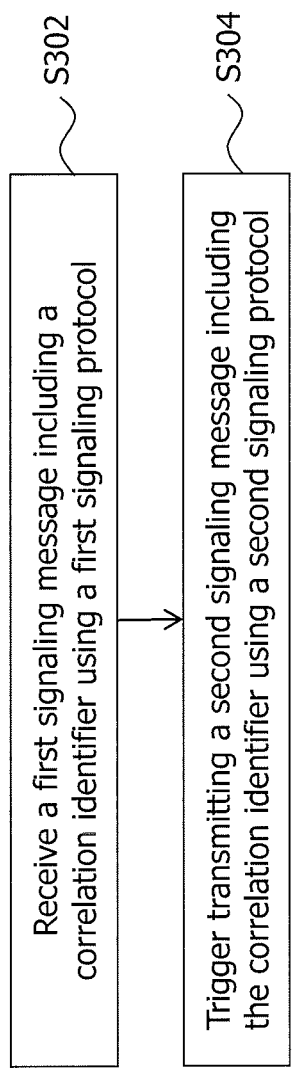

FIG. 3a schematically illustrates an exemplary modular composition of the computing unit 202 which is configured to execute a transferring network node and FIG. 3b illustrates a corresponding method embodiment which may be performed by the transferring network node. The basic operation of the transferring network node will be described in the following with reference to both FIGS. 3a and 3b.

In step S302, a receiving module 302 of the computing unit 202 may receive a first signaling message as part of a signaling procedure among a plurality of network nodes in the telecommunication network 100, the first signaling message being transmitted using a first signaling protocol and including a correlation identifier being propagated along a message flow of the signaling procedure. In step S304, a transmitting module 304 of the computing unit 202 may trigger transmitting a second signaling message as part of the signaling procedure using a second signaling protocol different from the first signaling protocol, wherein the correlation identifier of the first signaling message is incorporated into the second signaling message for further propagation.

The correlation identifier may be a (e.g., globally) unique identifier that is propagated along the message flow of the signaling procedure in order to enable correlating the signaling messages of the message flow based on the correlation identifier. During propagation in the message flow, the correlation identifier may remain unchanged so that the correlation identifier can be used as linking information that enables identifying that the signaling messages of the message flow belong together, e.g., belong to the same signaling procedure or, more generally, to the same end-to-end communication in the telecommunication network 100.

The first signaling message received by the receiving module 302 as part of the signaling procedure may be one among the signaling messages of the message flow and the second signaling message transmitted by the transmitting module 304 may be a subsequent signaling message of the message flow. By incorporating the correlation identifier from the first signaling message into the second signaling message, the correlation identifier may be propagated in the message flow to a next hop in the signaling procedure. The correlation identifier may also be said to be transferred from the first signaling message to the second signaling message. Since the first signaling message may be transmitted using a first signaling protocol and the second signaling message may be transmitted using a second signaling protocol different from the first signaling protocol, the correlation identifier may be propagated across different communication protocols used in the message flow and thereby enable signaling message correlation in the telecommunication network 100 across different protocols.

The signaling procedure may correspond to any flow of signaling messages exchanged between a plurality of network nodes in the telecommunication network 100, including the UE 102. In one implementation, the signaling procedure may be associated with, or more specifically, be initiated by the UE 102. In this case, the signaling procedure may comprise at least one of an attach procedure of the UE 102 to the telecommunication network 100, and a registration procedure of the UE 102 with a subsystem of the telecommunication network 100, for example. The subsystem of the telecommunication network may be the IMS 112, for example. It will be understood that these signaling procedures are merely exemplarily and that the correlation identifier may be passed along any other signaling procedure in the telecommunication network 100, such as call session procedures, re-registration procedures, de-registration procedures, service request procedures, bearer setup procedures, PDN establishment procedures, or the like. In some of these procedures, the procedure may also be initiated by a particular network node in the telecommunication network 100, and not necessarily by the UE 102, as mentioned above.

As indicated in FIG. 1, when the signaling procedure is associated with the UE 102, the correlation identifier may be generated by the UE 102 for propagation in the signaling procedure. Alternatively, the correlation identifier may be generated by a particular network node among the plurality of network nodes in the telecommunication network 100 upon receipt of a signaling message without correlation identifier as part of the signaling procedure. In this case, the particular network node may be an edge node of the telecommunication network 100 or a subsystem (or domain) thereof, e.g., a first node of the telecommunication network 100 or the subsystem (or domain) which receives a signaling message as part of the signaling procedure (e.g., initiated by the UE 102), wherein the signaling message does not include a correlation identifier. In the EPC 104, the edge node may be the MME 106 and, in case of the IMS 112, the edge node may be the P-CSCF 114, for example. It will be understood that the particular network node may also be given by any other network node in the telecommunication network 100, in which case correlation can be performed from this particular node on.

The message flow of the signaling procedure along which the correlation identifier is propagated may comprise all signaling messages of the signaling procedure (e.g., in case the UE 102 generates the correlation identifier and initiates the signaling procedure) or may comprise a subset of signaling messages of the signaling procedure (e.g., in case the UE 102 initiates the signaling procedure and the correlation identifier is generated by an edge node of the telecommunication network 100). In other words, the correlation identifier may be propagated in all messages of the signaling procedure subsequent to the generation of the correlation identifier. Additionally, the correlation identifier may also be propagated in (optionally all) messages associated with the UE 102 subsequent to completion of the signaling procedure, e.g., until the UE 102 detaches from the telecommunication network 100 or de-registers from its subsystem, respectively. Optionally, the correlation identifier may also be terminated and not be forwarded by a network node.

Each signaling protocol used for transmission of the signaling messages in the signaling procedure, e.g., each of the first signaling protocol and the second signaling protocol, may be one of an S1AP protocol, a NAS protocol, a Diameter protocol, an LDAP protocol, a GTP-C protocol, a GTP-U protocol, an SIP protocol, and a Megaco protocol (also known as H.248), for example. It will be understood, however, that these protocols are merely exemplarily and particularly apply to the case of the above-mentioned attach and registration procedures. Depending on the particular signaling procedure, it will be understood that other signaling protocols may be employed, such as a DNS protocol, a RADIUS protocol, a CAMEL protocol, a MAP protocol, an XCAP protocol, a LWM2M protocol, and an MQTT protocol, just to name a few.

As explained above, when the correlation identifier of the first signaling message is incorporated into the second signaling message, the correlation identifier may be said to be transferred from the first signaling message to the second signaling message for further propagation. Incorporating the correlation identifier of the first signaling message into the second signaling message may comprise transferring a value of the correlation identifier from a field of the first signaling message into a field of the second signaling message. In one implementation, the correlation identifier may be carried in an extension field of the respective signaling protocol. For example, in case of the SIP protocol as specified in IETF RFC 3261, the correlation identifier may be provided in an extension field of existing SIP headers and, in case of the Diameter protocol as specified in IETF RFC 6733, the correlation identifier may be provided as a new AVP extension. Alternatively, the correlation identifier may also be carried as encoded information within an existing parameter field of the respective signaling protocol. For example, the correlation identifier may be carried as encoded information in an existing P-Charging-Vector header of the SIP protocol. In this case, an extension of the respective signaling protocol may not be needed.

Figure 4B:
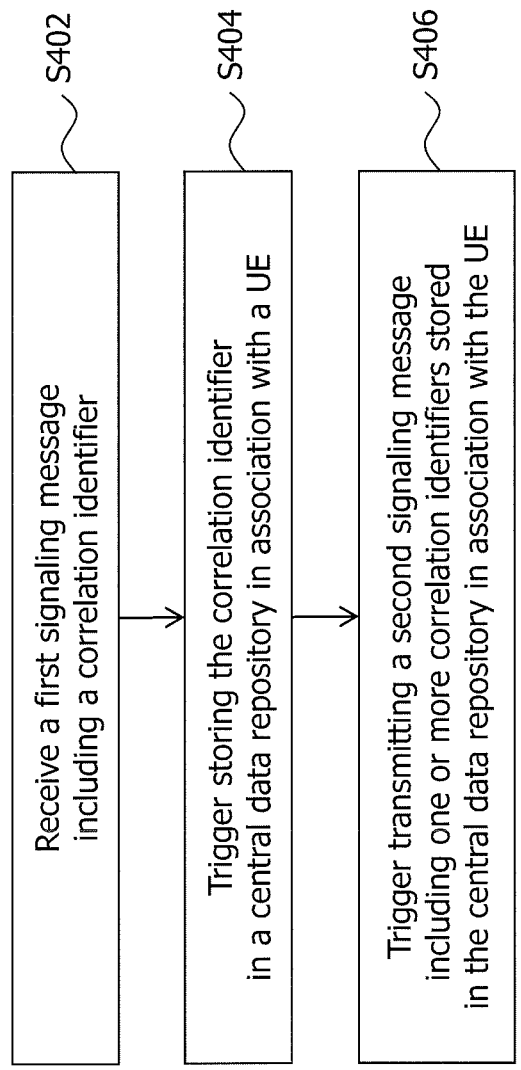

FIG. 4a schematically illustrates an exemplary modular composition of the computing unit 212 which is configured to execute a storing network node and FIG. 4b illustrates a corresponding method embodiment which may be performed by the storing network node. The basic operation of the storing network node will be described in the following with reference to both FIGS. 4a and 4b.

In step S402, a receiving module 402 of the computing unit 212 may receive a first signaling message as part of a signaling procedure among a plurality of network nodes in the telecommunication network 100, the first signaling message including a correlation identifier being propagated along a message flow of the signaling procedure. In step S404, a storing module 404 of the computing unit 212 may trigger storing the correlation identifier in the central data repository of the storing network node in association with the UE 102 associated with the signaling procedure. In step S406, a transmitting module 406 of the computing unit 212 may trigger transmitting a second message as part of the signaling procedure, wherein one or more correlation identifiers stored in the central data repository in association with the UE 102 are incorporated into the second signaling message for further propagation.

The method of FIG. 4b performed by a storing network node may be complementary to the method of FIG. 3b performed by a transferring network node. In particular, the second signaling message transmitted by the transferring network node may correspond to the first signaling message received by the storing network node. With reference to FIG. 1, the transferring network node may in this case correspond to the HSS 132 which receives signaling messages from the MME 106 using the Diameter protocol and which transmits subsequent signaling messages to the UDR 134 (corresponding to the storing network node) using the LDAP protocol in an attach procedure of the UE 102, for example. The storing network node may be configured to store a correlation identifier propagated during the signaling procedure in the central data repository in association with the UE 102 (e.g., more specifically, in association with a user profile associated with the UE 102). The central data repository may correspond to one or more databases which are hosted by the storing network node itself or which are hosted by one or more other nodes in the telecommunication network 100 (in the latter case, the central data repository may still be operated or used by the storing network node). The second signaling message transmitted by the transmitting module 406 may be a signaling message which is subsequent to the first signaling message received by the receiving module 402 in the message flow.

The one or more correlation identifiers stored in the central data repository in association with the UE 102 may each result from a different signaling procedure associated with the UE 102 carried out in the telecommunication network 100. In this context, the method performed by the storing network node may further comprise receiving a third signaling message as part of another (different) signaling procedure among a plurality of network nodes in the telecommunication network 100, the third signaling message including another (different) correlation identifier being propagated along a message flow of the other signaling procedure, and triggering storing the other correlation identifier in the central data repository in association with the UE 102.

In such a case, i.e., when two or more correlation identifiers are stored in the central data repository in association with the UE 102, wherein each of the two or more correlation identifiers results from a different signaling procedure, the two or more correlation identifiers may be incorporated into the second signaling message for further propagation. Providing the different correlation identifiers stored in association with the UE 102 with the second signaling message for further propagation in the signaling procedure may enable signaling message correlation across different signaling procedures, even when different correlation identifiers are used in each of these procedures.

In a system in which at least two transferring network nodes are available, it may happen that the first transferring network node is involved in a first signaling procedure and the second transferring network node is involved in a second signaling procedure, wherein the first signaling procedure and the second signaling procedure each comprise different message flows. Although the message flows of these procedures may be different, the first signaling procedure and the second signaling procedure may be associated with the same network entity, such as the UE 102, for example. Further, although the message flows of the signaling procedures may be associated with the same network entity, the first signaling procedure and the second signaling procedure may be performed in different domains. In the telecommunication network 100, such situation is given for the MME 106 and the I-/S-/E-CSCF 116, for example, which both correspond to transferring network nodes in the telecommunication network 100. While the MME 106 may act as transferring network node in an attach procedure of the UE 102 to the telecommunication network 100, the I-/S-/E-CSCF 116 may act as transferring network node in a registration procedure of the UE 102 with the IMS 112, for example.

If, in such a case, the correlation identifier propagated in the first signaling procedure (e.g., in the attach procedure of the UE 102) is identical to the correlation identifier propagated in the second signaling procedure (e.g., in the registration procedure of the UE 102 with the IMS 112), signaling message correlation may be performed using the identical correlation identifier across the different signaling procedures and the different domains of the telecommunication network 100. This situation is shown in FIG. 1 where the correlation identifier "A" is used for all signaling messages associated with the UE 102 in the telecommunication network 100. On the other hand, if the correlation identifier propagated in first signaling procedure (e.g., in the attach procedure of the UE 102) is different to the correlation identifier propagated in the second signaling procedure (e.g., in the registration procedure of the UE 102 with the IMS 112), signaling message correlation may be performed with the help of a storing network node which, as described above, may be capable of providing different correlation identifiers stored in association with the UE 102 for further propagation in a signaling procedure. In the example shown in FIG. 1, in the registration procedure of the UE 102 with the IMS 112 where the I-/S-/E-CSCF 116 directs part of the message flow to the HSS 132 and the UDR 134, the UDR 134 may return both stored correlation identifiers, i.e., the correlation identifier used in the first signaling procedure and the different correlation identifier used in the second signaling procedure, for further propagation throughout the rest of the registration procedure. By the correlation identifiers of the different signaling procedures, it may be determined that the signaling procedures in fact belong together and signaling message correlation may thus be enabled across different signaling procedures and also different domains, even when different correlation identifiers are used in the respective signaling procedures.

The following FIGS. 5a, 5b, 6a and 6b illustrate signaling diagrams which elucidate exemplary signaling procedures and corresponding correlation identifier propagation in the VoLTE network 100 of FIG. 1, in particular by the examples of attach procedures of the UE 102 and registration procedures of the UE 102 with the IMS 112. It will be understood that these procedures are merely exemplary and are presented to provide a better understanding of the correlation identifier propagation techniques presented herein. The skilled person will appreciate that actual signaling procedures may depart from these specific examples and that other signaling procedures may be performed.

Figure 5A:
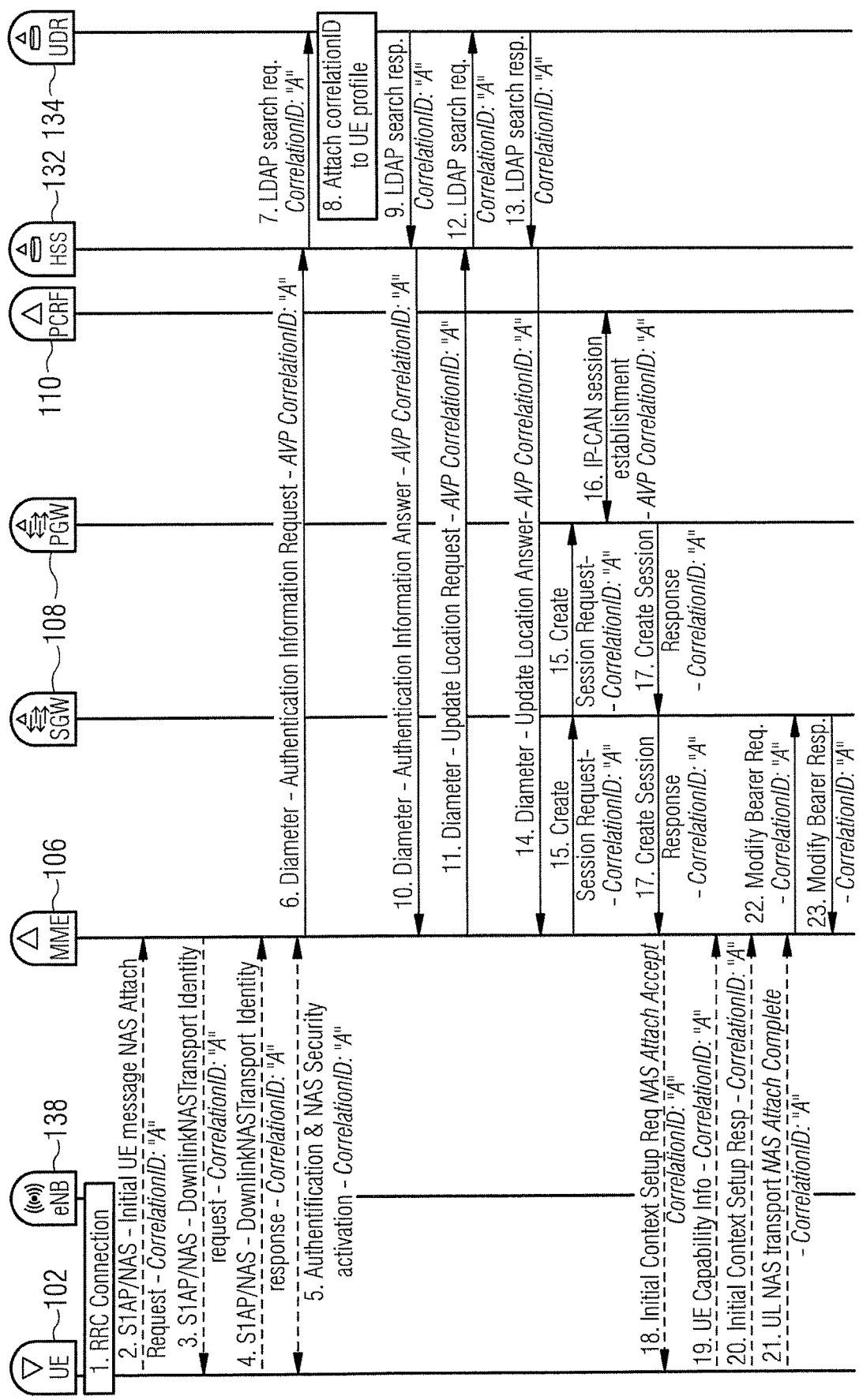

FIG. 5a illustrates a signaling diagram for an exemplary attach procedure of the UE 102 to the telecommunication network 100. In step 1 of the procedure, a Radio Resource Control (RRC) Connection setup between the UE 102 and the E-UTRAN 136 is performed via the eNodeB 138. In step 2, the UE 102 then generates a correlation identifier with a unique value "A" which is used for all upcoming messages in the attach procedure and which may also be used for all upcoming signaling messages after completion of the attach procedure until the UE 102 detaches from the telecommunication network 100. The generated correlation identifier "A" is sent with an S1AP/NAS Attach Request message towards the MME 106. In step 3, the MME 106 performs an identity request to retrieve a user identity associated with the UE 102, if needed, i.e., when the user identity is unknown to the MME 106. In the identity request, the MME 106 uses the same correlation identifier "A" and incorporates it into a corresponding S1AP/NAS message towards the UE 102. In step 4, the UE 102 again includes the correlation identifier "A" in the S1AP/NAS identity response. In step 5, the MME 106 performs authentication and NAS security activation, wherein, in the corresponding S1AP/NAS message exchange, the correlation identifier "A" is conveyed as well. In step 6, the MME 106 sends an Authentication Information Request towards the HSS 132 using the Diameter protocol. In this request, the correlation identifier "A" may be incorporated in the form of a new AVP with attribute "CorrelationID" and value "A". Further, in step 7, the HSS 132 sends an LDAP search request towards the UDR 134 using the LDAP protocol, again with the correlation identifier "A". In step 8, the UDR 134 stores the received correlation identifier "A" in association with a user profile of the UE 102 and, in step 9, the UDR 134 uses the same correlation identifier "A" in the corresponding LDAP search response sent to the HSS 132. In step 10, an Authentication Information Answer is sent back to the MME 106 using the Diameter protocol, still including the correlation identifier "A". In step 11, the MME 106 sends a Diameter Update Location Request to the HSS 132 for the UE 102 if the UE 102 is not already known by the MME 106 and subscription data exists. As this message is associated with the UE 102, the message also contains the correlation identifier "A". In steps 12 and 13, the HSS 132 sends an LDAP search request with correlation identifier "A" to the UDR 134 and gets a corresponding LDAP search response, both of which again include the correlation identifier "A". In step 14, the corresponding Update Location Answer sent from the HSS 132 to the MME 106 contains the correlation identifier with value "A" as well. Further, in step 15, the MME 106 sends a Create Session Request message to the S-GW/PDN-GW 108 to establish a default PDN connection. In the Create Session Request, the correlation identifier "A" is included in the corresponding GTPv2-C message. In step 16, the S-GW/PDN-GW 108 sends a Diameter Credit Control request to the PCRF 110 and receives a corresponding response to establish an IP Connectivity Access Network (IP-CAN) session. This message exchange also contains the correlation identifier "A". In step 17, a GTPv2-C Create Session Response is sent back from the S-GW/PDN-GW 108 to the MME 106 together with the correlation identifier "A". In the subsequent steps 18 to 23, the correlation identifier "A" is used in the upcoming messages related to the attach procedure of the UE 102 as well. This includes an exchange of an Initial Context Setup Response, a UE Capability Info, and Initial Context Setup Response and an NAS Attach Complete message in steps 18 to 21 as well as the Modified Bearer Request/Response messages in steps 22 and 23.

FIG. 5b illustrates a signaling diagram for an exemplary registration procedure of the UE 102 with the IMS 112 which may be performed subsequent to the attach procedure illustrated in FIG. 5a. In the registration procedure, a different correlation identifier "B" is generated by the UE 102. A prerequisite for the registration procedure is that the UE 102 has successfully completed the attach procedure and that a Default Access Point Name (APN) is established for the IMS 112.

In step 1 of the registration procedure, the UE 102 generates a new correlation identifier with a unique value "B" which is used for all messages associated with the registration procedure and which may also be used for all upcoming signaling messages after completion of the registration procedure until the UE 102 de-registers from the IMS 112. The UE 102 then sends an SIP Register message towards the P-CSCF 114 including the correlation identifier "B". In step 2, the P-CSCF 114 copies the correlation identifier "B" into a subsequent SIP Register message sent towards the I-/S-/E-CSCF 116 which, in step 3, sends a Diameter User Authorization Request to the HSS 132, wherein the correlation identifier "B" may be incorporated in the form of a new AVP with attribute "CorrelationID" and value "B". In step 4, the HSS 132 sends an LDAP search request towards the UDR 134 using the LDAP protocol, again including the correlation identifier "B". In step 5, the UDR 134 stores the received correlation identifier "B" in association with the user profile of the UE 102. As the correlation identifier with value "A" is already stored in association with the UE 102, the UDR 134 appends the value "B" to the correlation identifiers stored in association with the UE 102. From that point on, the UDR 134 uses both correlation identifiers for any signaling procedures associated with the UE 102 and provides both values "A" and "B" in the LDAP search response in step 6. In step 7, the HSS 132 replies with a Diameter User Authorization Answer including both correlation identifiers "A" and "B". In step 8, the I-CSCF of the I-/S-/E-CSCF 116 (in the presented example, the I-CSCF, the S-CSCF and the E-CSCF are co-located in the same box) selects an S-CSCF and forwards the SIP Register to it. The S-CSCF, in turn, receives the SIP Register and contacts the HSS 132 with a Diameter Multimedia Authentication Request to retrieve authentication vectors for the IMS subscriber, again including both correlation identifiers "A" and "B". In steps 9 and 10, the HSS 132 sends an LDAP search request to the UDR 134 and gets a corresponding LDAP search response, both of which again include correlation identifiers "A" and "B". In step 11, the HSS 132 replies with a Diameter Multimedia Authentication Answer that carries both correlation identifiers "A" and "B". In the presented example, in step 12, the S-CSCF replies to the SIP Register with an SIP "401 Unauthorized" to the P-CSCF 114 which includes both correlation identifiers "A" and "B" and, in step 13, the P-CSCF 114 forwards the SIP "401 Unauthorized" towards the UE 102. As can be seen in FIG. 5b, in subsequent steps 14 to 25, both correlation identifiers "A" and "B" are used in all messages of the registration procedure until, in step 25, the UE 102 receives an SIP "200 OK".

In the examples of FIGS. 5a and 5b, the correlation identifiers used in the attach procedure and the registration procedure are initially generated by the UE 102. FIGS. 6a and 6b illustrate variants of the same procedures in which the correlation identifiers are not initially generated by the UE 102, but by respective edge nodes of the EPC 104 and the IMS 112, i.e., by the MME 106 in case of the attach procedure and by the P-CSCF 114 in case of the registration procedure of the UE 102. The attach procedure shown in FIG. 6a thus differs from the example of FIG. 5a only in that, in step 2, the UE 102 sends the S1AP/NAS Attach Request message towards the MME 106 without a correlation identifier. It is then the MME 106 which generates the correlation identifier "A", which is then used for all subsequent messages in the attach procedure. Similarly, the registration procedure shown in FIG. 6b differs from the example of FIG. 5b only in that, in step 1, the UE 102 sends the SIP Register message towards the P-CSCF 114 without a correlation identifier. It is then the P-CSCF 114 which generates the correlation identifier "B", which is then used for all subsequent messages in the registration procedure. In both procedures of FIGS. 6a and 6b, once the correlation identifier is propagated back towards the UE 102, the UE 102 uses the correlation identifier in subsequent communication in the telecommunication network 100.

Figure 7:
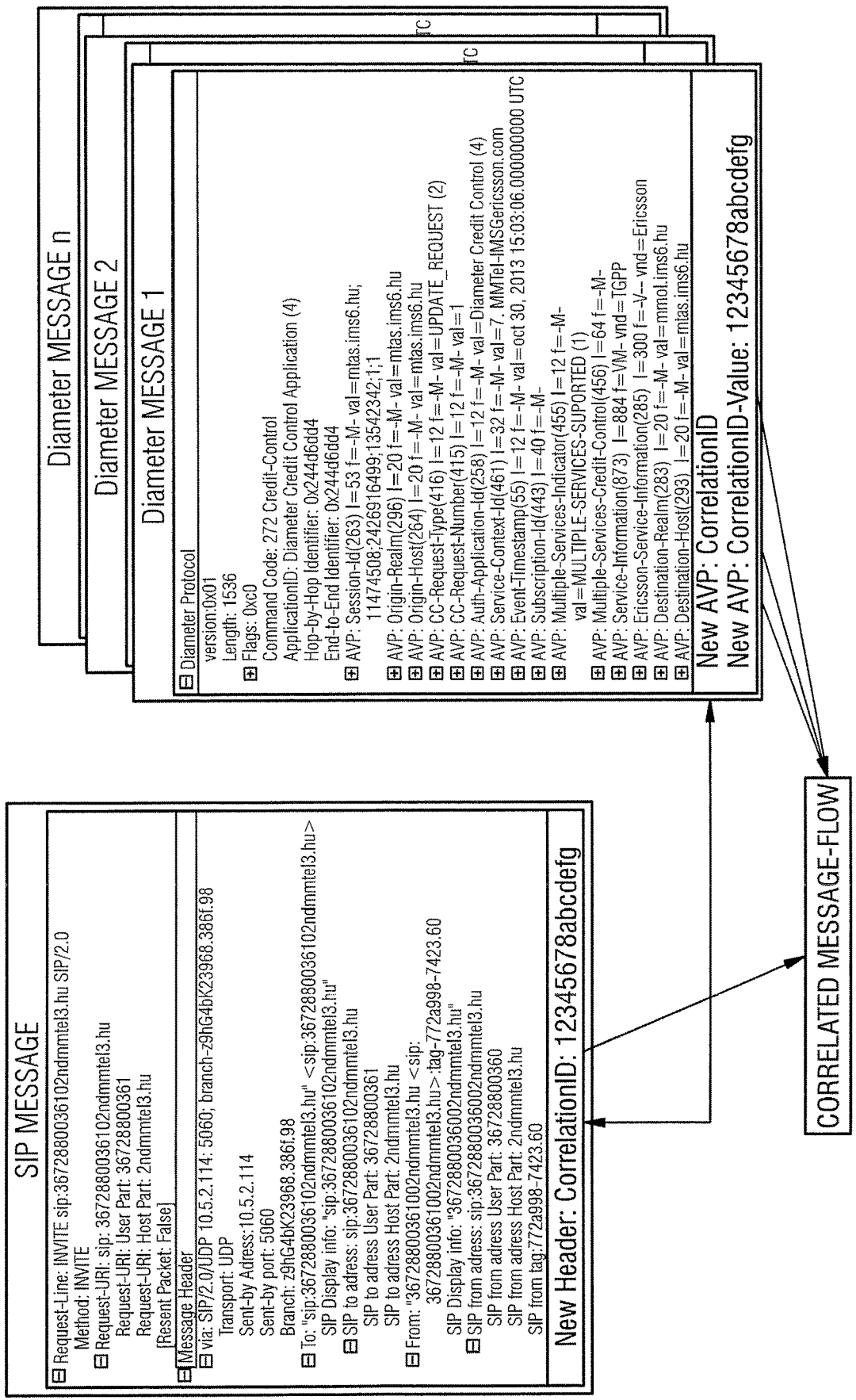
FIG. 7 illustrates exemplary formats for the transmission of correlation identifiers in signaling messages using the SIP protocol and the Diameter protocol.

FIG. 7 illustrates exemplary formats for the transmission of correlation identifiers in signaling messages using the SIP protocol and the Diameter protocol. It will be understood that these formats are merely exemplary and that other formats are generally conceivable. Also, it will be understood that, in other signaling protocols, the formats may differ as well. Correlation of the exemplary signaling messages shown in FIG. 7 may be performed based on the respective correlation identifiers by a correlation entity (not shown in the figures) provided in the telecommunication network 100 or in a cloud, for example.

As indicated in FIG. 7, in SIP messages, the correlation identifier may be carried in an extension field of the SIP header. The header field may contain "CorrelationID" followed by a colon (":") and the value of the correlation identifier. In FIG. 7, the exemplary header field is given as follows:

CorrelationID: 12345678abcdefg

Multiple correlation identifier values may then be appended by separating commas (","). As an example, such header may be given as follows:

CorrelationID: 12345678abcdefg, gfedcba87654321

In Diameter messages, on the other hand, the correlation identifier may be carried as an AVP extension, for example. In FIG. 7, the AVP extension has the following form:

AVP: CorrelationID
AVP: CorrelationID-Value: 12345678abcdefg

Multiple correlation identifiers may then be provided as additional values, e.g.:

AVP: CorrelationID
AVP: CorrelationID-Value: 12345678abcdefg
AVP: CorrelationID-Value: gfedcba87654321

As has become apparent from the above, the present disclosure provides a technique for enabling signaling message correlation in a telecommunication network. The presented technique may particularly be used to enable signaling message correlation in end-to-end communications across different communication protocols as well as across different signaling procedures performed in the telecommunication network, including different domains of the telecommunication network, even when different correlation identifiers are used in the signaling procedures. Using the presented technique, end-to-end tracing of signaling flows, such as call flows, for example, may be facilitated and information from different entities involved in the signaling flows as well as overall information used by the different entities may be obtained more easily. More effective troubleshooting of network-related problems or collection of data for analytics systems may thus be achieved.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for enabling signaling message correlation in a telecommunication network, the method being performed by a network node in the telecommunication network, the method comprising:
    receiving a first signaling message as part of a signaling procedure among a plurality of network nodes in the telecommunication network, the first signaling message being transmitted using a first signaling protocol and including a correlation identifier being propagated along a message flow of the signaling procedure, the correlation identifier enabling correlation of signaling messages in the message flow, the signaling procedure comprising at least one of:
        an attach procedure of a user equipment to the telecommunication network; and
        a registration procedure of a user equipment with a subsystem of the telecommunication network; and
    triggering transmitting a second signaling message as part of the signaling procedure using a second signaling protocol different from the first signaling protocol, the correlation identifier of the first signaling message being incorporated into the second signaling message for further propagation, the correlation identifier being carried in an extension field of the respective signaling protocol and the correlation identifier generated by a particular network node among the plurality of network nodes upon receipt of a signaling message without a correlation identifier as part of the signaling procedure, the particular network node being an edge node of the subsystem.

2. The method of claim 1, wherein the signaling procedure is initiated by a user equipment.

3. The method of claim 2, wherein each of the first signaling protocol and the second signaling protocol is one of:
    an S1 Application Protocol, S1 AP,
    a Non Access Stratum, NAS, protocol,
    a Diameter protocol,
    a Lightweight Directory Access Protocol, LDAP,
    a General Packet Radio Service, GPRS, Tunneling Protocol for Control plane, GTP-C,
    a GPRS Tunneling Protocol for User plane, GTP-U,
    a Session Initiation Protocol, SIP, and
    a Media Gateway Control Protocol, Megaco/H.248.

4. The method of claim 1, wherein the correlation identifier is propagated in all messages of the signaling procedure subsequent to the generation of the correlation identifier.

5. The method of claim 1, wherein each of the first signaling protocol and the second signaling protocol is one of:
    an S1 Application Protocol, S1AP,
    a Non Access Stratum, NAS, protocol,
    a Diameter protocol,
    a Lightweight Directory Access Protocol, LDAP,
    a General Packet Radio Service, GPRS, Tunneling Protocol for Control plane, GTP-C,
    a GPRS Tunneling Protocol for User plane, GTP-U,
    a Session Initiation Protocol, SIP, and
    a Media Gateway Control Protocol, Megaco/H.248.

6. A method for enabling signaling message correlation in a telecommunication network, the method being performed by a network node operating a central data repository of the telecommunication network, the method comprising:
    receiving a first signaling message as part of a signaling procedure among a plurality of network nodes in the telecommunication network, the first signaling message including a correlation identifier being propagated along a message flow of the signaling procedure, the correlation identifier enabling correlation of signaling messages in the message flow;
    triggering storing the correlation identifier in the central data repository in association with a user equipment associated with the signaling procedure; and
    triggering transmitting a second signaling message as part of the signaling procedure, at least one correlation identifier stored in the central data repository in association with the user equipment is incorporated into the second signaling message for further propagation, the correlation identifier stored in the central data repository being carried in an extension field of the respective signaling protocol and the correlation identifier generated by a particular network node among the plurality of network nodes upon receipt of a signaling message without a correlation identifier as part of the signaling procedure, the particular network node being an edge node of the subsystem.

7. The method of claim 6, wherein at least two correlation identifiers are stored in the central data repository in association with the user equipment, each of the at least two correlation identifiers resulting from a different signaling procedure, wherein the at least two correlation identifiers are incorporated into the second signaling message for further propagation.

8. A computing unit for executing a network node enabling signaling message correlation in a telecommunication network, the computing unit comprising at least one processor and at least one memory, the at least one memory containing instructions executable by the at least one processor such that the network node is configured to perform a method for enabling signaling message correlation in a telecommunication network, the method being performed by a network node in the telecommunication network, the method comprising:
  receiving a first signaling message as part of a signaling procedure among a plurality of network nodes in the telecommunication network, the first signaling message being transmitted using a first signaling protocol and including a correlation identifier being propagated along a message flow of the signaling procedure, the correlation identifier enabling correlation of signaling messages in the message flow, the signaling procedure comprising at least one of:
    an attach procedure of a user equipment to the telecommunication network; and
    a registration procedure of a user equipment with a subsystem of the telecommunication network; and
  triggering transmitting a second signaling message as part of the signaling procedure using a second signaling protocol different from the first signaling protocol, the correlation identifier of the first signaling message being incorporated into the second signaling message for further propagation, the correlation identifier being carried in an extension field of the respective signaling protocol and the correlation identifier generated by a particular network node among the plurality of network nodes upon receipt of a signaling message without a correlation identifier as part of the signaling procedure, the particular network node being an edge node of the subsystem.

9. A computing unit for executing a network node enabling signaling message correlation in a telecommunication network, the network node operating a central data repository of the telecommunication network, the computing unit comprising at least one processor and at least one memory, the at least one memory containing instructions executable by the at least one processor such that the network node is configured to perform a method for enabling signaling message correlation in a telecommunication network, the method being performed by a network node operating a central data repository of the telecommunication network, the method comprising:
  receiving a first signaling message as part of a signaling procedure among a plurality of network nodes in the telecommunication network, the first signaling message including a correlation identifier being propagated along a message flow of the signaling procedure, the correlation identifier enabling correlation of signaling messages in the message flow;
  triggering storing the correlation identifier in the central data repository in association with a user equipment associated with the signaling procedure; and
  triggering transmitting a second signaling message as part of the signaling procedure, at least one correlation identifier stored in the central data repository in association with the user equipment is incorporated into the second signaling message for further propagation, the correlation identifier stored in the central data repository being carried in an extension field of the respective signaling protocol and the correlation identifier generated by a particular network node among the plurality of network nodes upon receipt of a signaling message without a correlation identifier as part of the signaling procedure, the particular network node being an edge node of the subsystem.

* * * * *